United States Patent [19]

Leonard

[11] Patent Number: 5,554,843
[45] Date of Patent: Sep. 10, 1996

[54] OPTICAL ELEMENT DRIVING MECHANISM

[75] Inventor: John R. Leonard, Glendale, Ariz.

[73] Assignee: Honeywell Inc., Minneapolis, Minn.

[21] Appl. No.: 301,507

[22] Filed: Sep. 6, 1994

[51] Int. Cl.[6] ........................................... G01J 1/20
[52] U.S. Cl. ...................... 250/201.5; 359/811; 359/824; 369/44.14
[58] Field of Search ...................... 250/201.5; 369/244, 369/215, 219, 44.14, 44.15, 44.16; 359/811, 824

[56] References Cited

U.S. PATENT DOCUMENTS

| | | | |
|---|---|---|---|
| 4,660,190 | 4/1987 | Fujii et al. | 369/44.16 |
| 4,956,833 | 9/1990 | Kokado et al. | |
| 5,297,114 | 3/1994 | Itoh et al. | 250/201.5 |

Primary Examiner—Georgia Y. Epps
Assistant Examiner—Jacqueline M. Steady
Attorney, Agent, or Firm—Kenneth J. Johnson

[57] ABSTRACT

An optical element driving mechanism is disclosed wherein an electromagnetic motor positions an optical element such that a laser beam passing through the optical element is focused onto an optical disk media. The optical element can be translated in two axes by energizing coils suspended within stationary magnetic fields produced by permanent magnets. The magnitude and direction of displacement is controlled by the current passing through the coils. A two axis electro-optical position sensing apparatus for determining the position of the optical element is embedded within the driving mechanism. The position sensing apparatus detects the relative position of the optical element in two axes by imaging a light emitting diode onto a four element photodetector.

16 Claims, 5 Drawing Sheets

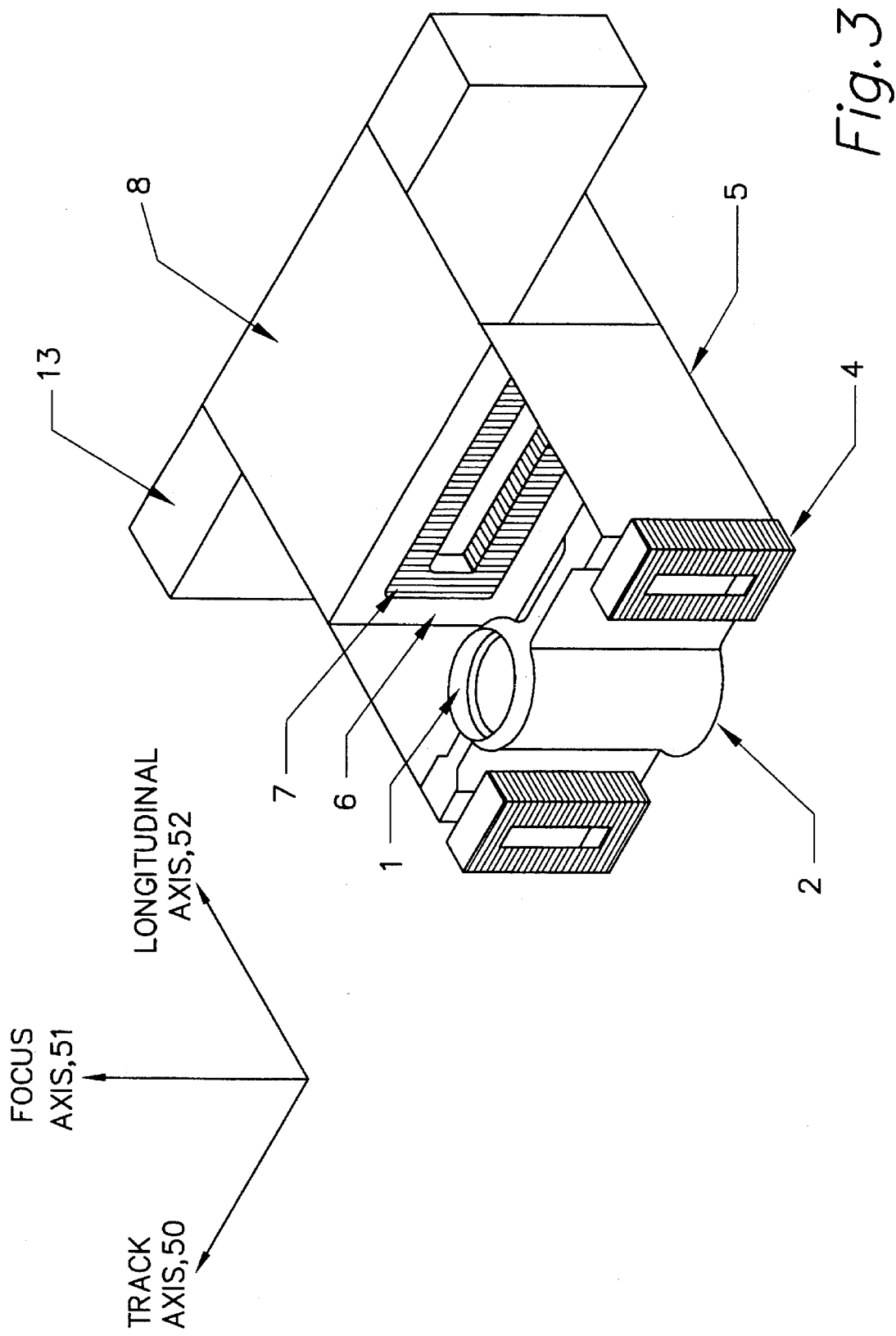

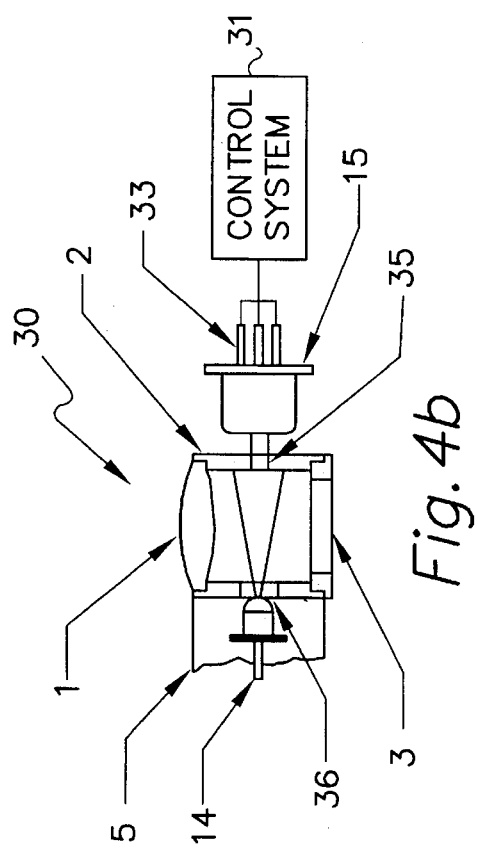
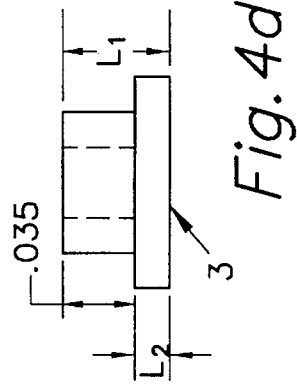
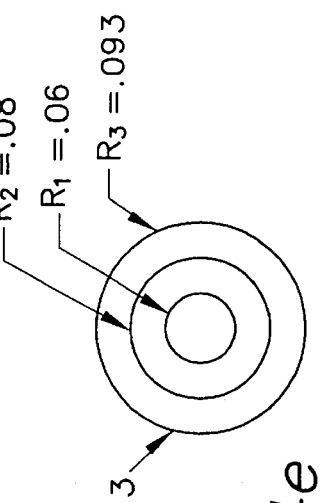
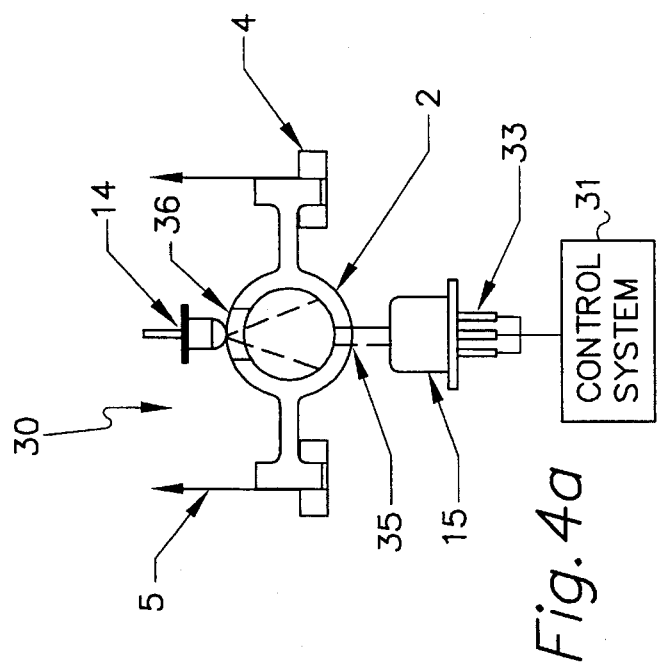
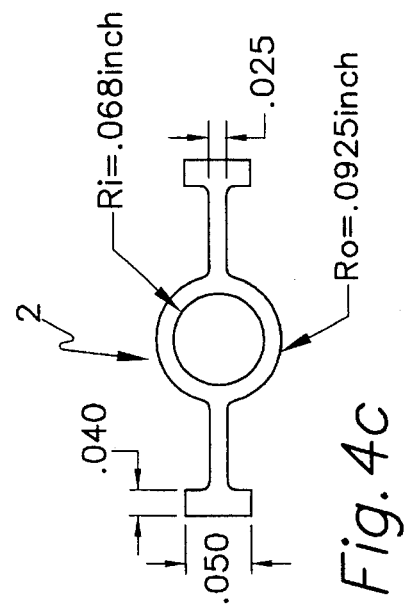

TRACK POSITION = (B+D)−(A+C) = 0
FOCUS POSITION = (A+B)−(C+D) = 0

TRACK POSITION = (B+D)−(A+C) = X
FOCUS POSITION = (A+B)−(C+D) = Z

OPTICAL ELEMENT DRIVING MECHANISM

BACKGROUND OF THE INVENTION

In optical disk drive storage devices, information is written to and read off of a rotating disk via a focused laser beam from a disk reading mechanism. Information is stored on the disk in binary form on concentric circles called tracks. Because the rotating disk is subject to axial and radial accelerations, a driving mechanism is necessary to dynamically position an optical element which focuses the laser beam on the desired track. The positioning of the optical element is normally achieved by utilizing two feedback control loops, one for controlling motion in the track axis, and one for controlling motion in the focus axis. The driving mechanism (actuator) serves to support the optical element and convert the feedback control signal into mechanical motion in both the track and focus axes. The control systems often lack authority to position the actuator when subjected to shock and vibration, in which case the loop is broken and control of the actuator is lost. When control of the actuator is lost, it would be advantageous to have a secondary set of control loops which can be utilized to regain control of the driving element more quickly than if only the primary track and focus control loops were used.

Many optical element positioning mechanisms exist. With most two axis actuators, a pair of track axis driving coils for creating movement in one axis, and a focus axis driving coil for creating movement in a second axis, are utilized. These coils are placed on the support structure of the optical element. The optical element is then translated in either axis by energizing the appropriate driving coil which creates a force to move the optical element. A problem exists with this method of positioning the optical element. Since both driving coils are located on the optical element structure, more mass must be overcome in order to move the optical element in the track axis. This translates into more force and power required during operation. It is desirable to have efficient operation and minimize power used by the actuator.

Some actuators on the market utilize a single axis secondary position detection mechanism. The most common detection approach is to add an appendage to the movable portion of the actuator and shine a light against it, creating a shadow on the two element photodetector. If the photodetector elements are unevenly illuminated, a differential signal proportional to the displacement of the optical element is produced. The problem with this existing mechanism is that position detection is possible in only a single axis.

SUMMARY OF THE INVENTION

The present invention is an apparatus for positioning of an optical element. The apparatus includes a mechanism to determine the position of the optical element and mechanisms to move the optical element. The apparatus further includes a support structure to support the aforementioned mechanisms and driving coils and magnets which will be used to implement the positioning of the optical element.

It is an object of the invention to provide a mechanism to determine in two axes the position of the optical element.

Another object of the invention is to increase the efficiency in moving the optical element.

BRIEF DESCRIPTION OF THE FIGURES

FIG. 3 is an isometric view of the actuator showing a more revealed view of the driving coils and the flexures.

FIG. 4a shows a top view of the position sensing system in the actuator of the present embodiment.

FIG. 4b shows a side view of the position sensing system in the actuator of the present embodiment.

FIG. 4c shows a top view of a support structure for an optical element in the position sensing system.

FIG. 4d is a side view of a counterbalance for an optical element in the position sensing system.

FIG. 4e is a top view of the counterbalance for an optical element in the position sensing system.

DETAILED DESCRIPTION OF THE PRESENT INVENTION

Figure 1:
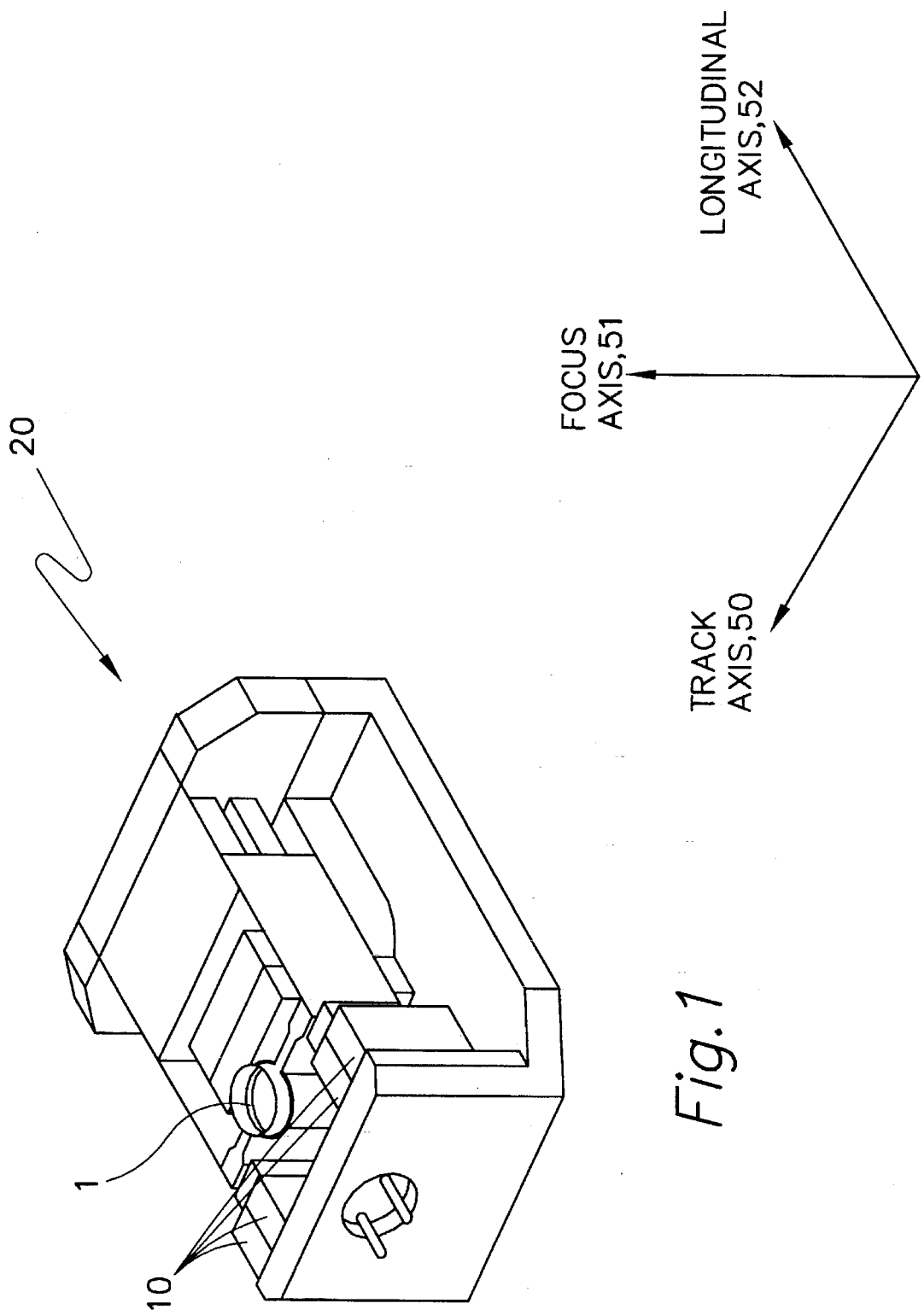
FIG. 1 shows a side view of the actuator of the present embodiment.
Figure 2:
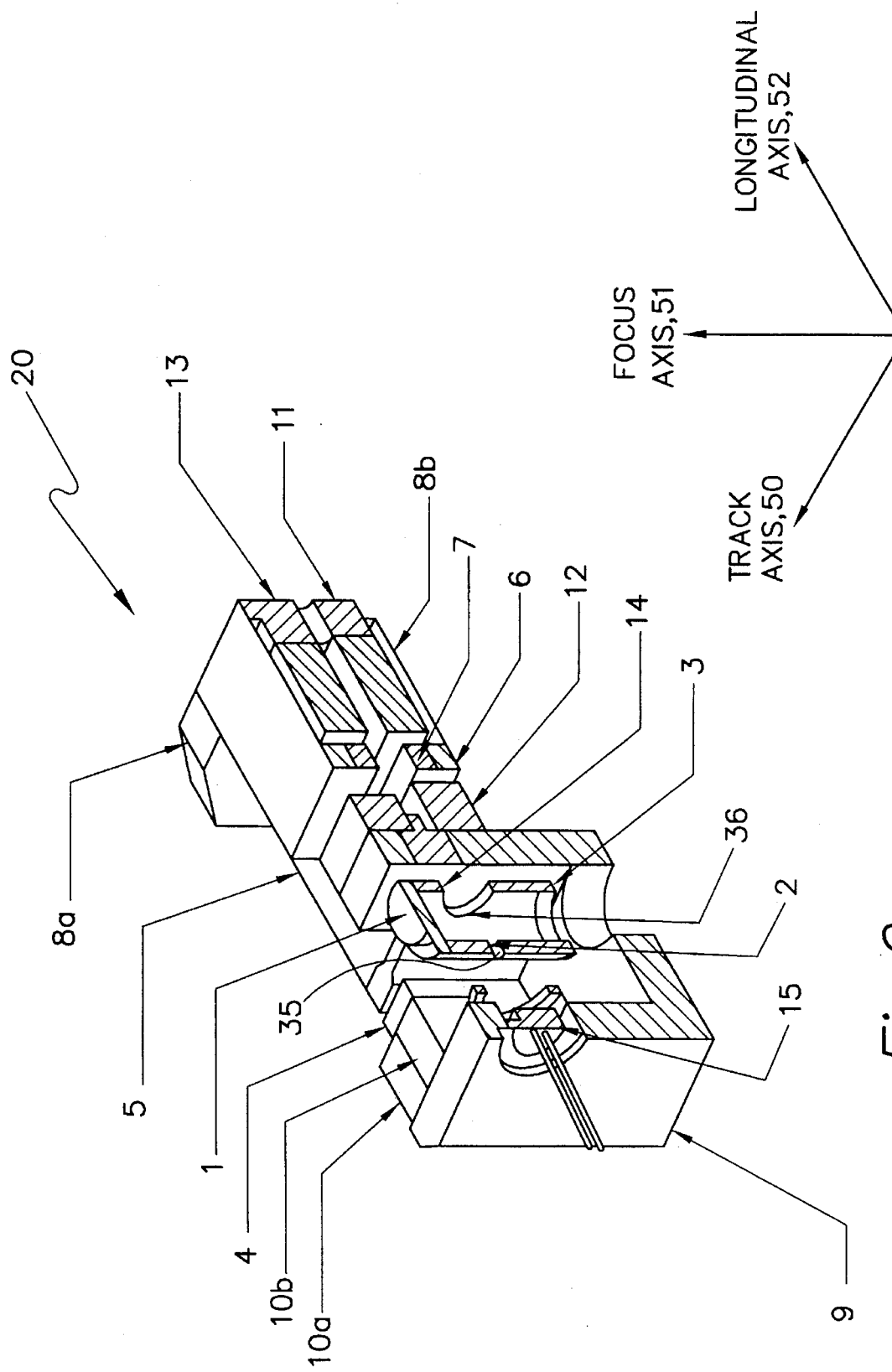
FIG. 2 shows a cut away side view of the actuator of the present embodiment.

The actuator 20 of the preferred embodiment, as seen in FIG. 1 and FIG. 2, is a very small device that is used in optical storage devices or computer disk drives. Numerous measurements are cited within the current specification for illustration purposes and are in no way intended to limit the scope of the present invention. The length of the actuator 20 is approximately 1.5 inches. The height is approximately half an inch and the width is approximately 0.75 inches. The actuator 20 is a two axis linear actuator that operates along two axes designated by the track axis 50 and the focus axis 51. The actuator 20 includes many elements that allow movement in these two planes. The actuator 20 positions an optical element 1 that is embedded in the actuator 20 which provides a feedback source for closed-loop control of both axes of motion.

Referring now specifically to FIG. 2, the actuator 20 has an optical element 1, which in the preferred embodiment is an objective lens. The radius of the objective lens of the preferred embodiment is approximately 0.068 of an inch. The objective lens 1 is used to focus a light source onto a storage medium for write-once or erasable data. The objective lens 1 is manufactured from either molded plastic or glass and is well known in this area of technology.

The support structure for the optical element 1 is a bobbin 2. The optical element 1 is attached to the bobbin 2 by a UV-curing or other adhesive. The bobbin 2 can be molded from plastic such as Ultem®, or machined from non-ferrous lightweight metal such as aluminum or magnesium. A counterbalance 3 is used to offset the mass of the objective lens 1 in the bobbin 2 about the center of gravity of the bobbin 2. The counterbalance 3 can be molded or machined as a separate part, or can be included as an integral feature of the bobbin 2. The counterbalance 3 is placed there so that electromagnetic forces that are going to be acting on the actuator 20 are directed through the center of gravity. The counterbalance 3 acts as a means to better balance the actuator 20 as well.

An aperture 35 exists in the center of bobbin 2. This aperture 35 is circular with a diameter of about ⅛ of an inch. Many other sized apertures could be used depending on the size of the photodetector and/or the required distance to be traveled by the bobbin 2. A clearance hole 36 exists on the other side of the bobbin 2 opposite the aperture 35. The purpose of the aperture 35 and clearance hole 36 will be described in greater detail later.

Figure 5A:
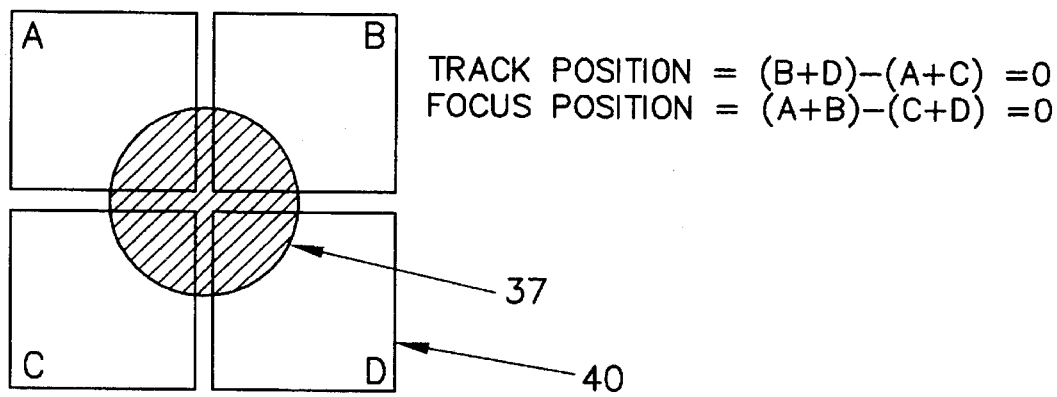
FIG. 5a shows the inside of the photodetector when the optical element is in proper position.
Figure 5B:
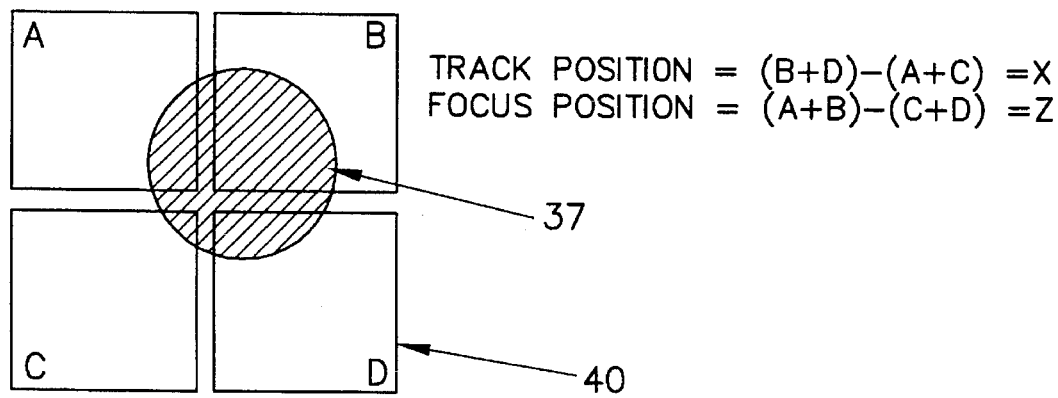
FIG. 5b shows the inside of the photodetector when the optical element is out of position.

A light emitting diode (LED) 14, or any suitable light source, is used to illuminate through the circular aperture 35 in the bobbin structure 2 so that a light spot 37 is projected onto a photodetector 15. The LED 14 is located directly behind the bobbin 2. The photodetector 15 is made up of four individual elements to determine the bobbin 2 position in the two axes. As the bobbin 2 is displaced in the track axis 50 and/or focus axis 51, the elements will become unevenly illuminated. This will result in a differential output proportional to the magnitude of displacement. The bobbin position can then be determined by using sums and differences of the photodetector 15 elements. FIG. 5 shows a spot 37 on four individual photodetector elements 40. FIG. 5a shows the spot 37 evenly illuminated in the four photodetector elements 40, and FIG. 5b shows uneven illumination. The photodetector 15 can then be dynamically aligned with the LED 14 in the bobbin aperture 35 to null the output. The photodetector 15 is attached to the actuator 20 through suitable adhesives. Attaching the photodetector 15 to the actuator 20 is not limited to adhesives. There are many other technical possibilities to attach the photodetector 15 to the actuator 20.

Two track axis driving coils 4 are used to move the bobbin 2. One track axis driving coil 4 exists on each side of the bobbin 2 and are attached to the bobbin 2 with any suitable high temperature adhesives which are well known in this area of technology. The track coils 4 are continuously wound small gauge magnetic wire. The wire is wound around a mandrel and then the mandrel is removed to leave the wire. The movement of the bobbin 2 will be proportional to the current flowing through the coils 4.

Two track axis parallel flexures 5 are used to support the bobbin 2 and provide a low spring rate in the track axis 50 and a high spring rate in the focus axis 51. The track axis parallel flexures 5 in the preferred embodiment have a thickness of about 0.001 inch and can be chemically machined or stamped from a spring material such as beryllium-copper or 302 stainless steel.

For the focus plane, a single focus axis driving coil 7 is used in the preferred embodiment which is made from continuously wound small gauge magnetic wire. The focus axis driving coil 7 is formed the same way as the track axis driving coils 4. This focus axis driving coil 7 provides the force to move the bobbin 2 in the track axis 50. Again, the distance that the bobbin 2 moves is proportional to the current that is within the focus axis driving coil 7.

Focus axis parallel flexures 8 are used to support the focus axis driving coil 7 and the bobbin 2. Two sets of flexures 8 exist. One flexure 8a is at the top of the actuator 20 above a focus coil support structure 6, focus axis driving coil 7, focus axis magnet 11 and flexure support 13 all of which will be defined later (except the focus axis driving coil 7 which has already been defined). The other flexure 8b exists at the bottom of the actuator 20 under the aforementioned components. These flexures 8 require a low spring rate in the focus axis 51 and a high spring rate in the track axis 50 to allow movement in the track axis 50. The focus axis parallel flexures 8 in the preferred embodiment have a thickness of about 0.001 inches. Again, these focus axis parallel flexures 8 are chemically machined or stamped from a spring material such as beryllium copper or 302 stainless steel similar to the track axis parallel flexures 5.

A focus coil support structure 6 is used to connect the track and focus flexures 5 and 8 respectively. The focus coil support structure 6 also provides the capability of affixing the focus axis driving coil 7. The flexures 5 and 8 and the focus axis driving coil 7 are attached to the support structure 6 by high temperature adhesives which are well known in this area of technology. Attaching the flexures 5 and 8 and the focus axis driving coil 7 to the support structure 6 is not limited to adhesives. Many other technical possibilities exist in performing the attachment. This support structure 6 can be made from either a plastic such as Ultem®, or a nonferrous lightweight material such as aluminum or magnesium.

Magnets are used in the track axis 50 and focus axis 51 to create the force to move the bobbin 2. There are four track axis magnets 10; two existing on each side of the bobbin 2. In the focus axis 51, four focus axis magnets 11 and 12 are used. These magnets 10, 11, 12 provide a magnetic field from which the energized track coils 4 can convert electrical energy into mechanical energy and create a force in order to move the bobbin 2 in the track axis 50 and the focus axis 51. These magnets 10, 11, 12 are high energy product permanent magnets such as neodymium or samarium cobalt. These magnets 10, 11, 12 are arranged in pairs with adjacent north and south poles. This means that the poles of the magnets 10, 11, 12 are opposite. For example, the north pole of 10a is facing the track driving coil 4 and the south pole of 10b is facing the track driving coil 4.

A flexure support 13 is used for four functions. First, it provides surfaces to which the focus flexures 8 are bonded. Second, it provides a flux shunt for the focus magnets 11 and 12. Third, it provides a through hole for mounting of the LED 14, and, fourth, it provides alignment and attachment features for mounting to an actuator base 9. The flexure support 13 can be made or cast from a high permeability metal alloy.

The actuator base 9 constrains the flexure support 13 as well as all non-moving components within the actuator 20, such as the magnets 10, 11, 12 and the LED 14. These components are attached to the base 9 with the same high temperature adhesives that have been mentioned throughout this description. This base 9 is machined or cast from a high permeability-metal alloy in the preferred embodiment. The base 9 also acts as a shunt to the magnets 10, 11, 12. The actuator base 9 is used to attach the actuator 20 to the "outside world." This attachment can be done through mounting holes and alignment features.

FIG. 3 shows a clearer view of the track axis driving coils 4, focus coil support structure 6, focus axis driving coil 7 and flexure support 13 without the magnets 10, 11, 12 and actuator base 9.

The actuator 20 can translate the optical element 1 in the focus axis 51 or track axis 50 by energizing the appropriate driving coils 4 or 7. Current flowing through the appropriate driving coils 4 or 7, and the magnetic flux created by the permanent magnets 10 or 11, 12, create a force to move the optical element 1. This can be seen by equation (1):

$$F = il \times B \tag{1}$$

where
 F=Force
 i=Current in the coils
 l=Length of coils
 B=Magnetic flux of magnets The forces that act on the coils 4 or 7 cause the actuator to accelerate at a rate proportional to the current in the coils 4 or 7. The actuator 20 will reach an equilibrium position once the electromagnetic force equals the spring force exerted by the deflected flexures 5 or 8.

For example, to move the optical element 1 left in the track axis 50, the current is increased in one direction in the track axis driving coils 4. The interaction of the current with the track axis magnets 10 will push the bobbin 2 to the left. If the current in the track axis driving coil 4 is increased in the other direction, the bobbin 2 will move right. The same theory applies to movement in the focus axis 51.

The force of the actuator 20 is optimized due to the placement of the focus coil 7. Previously, the focus coil 7 was attached to the bobbin 2 restraining the force constant. In the present embodiment, the focus coil 7 has been removed from the bobbin 2 and placed behind the bobbin 2 at the end of the flexures between the track flexures 5 and the focus flexures 8, thus reducing the mass in moving the optical element 1 and maximizing the force constant. Also, this allows for the focus coil 7 to be constrained in all but the focus axis 51 so that any off axis twisting movements about the bobbin's center of gravity is eliminated.

Also, the two axis feature of the present embodiment helps provide support to the bobbin 2 to prevent it from moving and becoming off balance while the actuator 20 is positioning the optical element 1.

FIG. 4 shows the part of the actuator 20 that operates as a position sensing system 30. The position sensing system 30 includes the photodetector 15, the LED 14 and an aperture 35 in the bobbin. A clearance hole 36 exists on the opposite side of the bobbin 2 to allow light from the LED 14 to travel through the clearance hole 36, through the bobbin 2 and then through the aperture 35. The aperture 35 is at the center of gravity of the optical element positioning system 30 to minimize twisting motions. FIG. 4a shows a top view of the system 30 and FIG. 4b shows a side view of the system 30. The photodetector 15 is made of five elements: four photodetector elements and a power element. Looking at FIGS. 4a and 4b, the elements can be seen by the leads 33 that come out of the photodetector 20. As mentioned before, one lead is for power and the rest of the leads are used to sense the position of the optical element 1 in the track axis 50 and the focus axis 51. FIG. 4c shows the dimensions and a top view of the bobbin 2. FIG. 4d shows the dimensions and a side view of the counterbalance 3. FIG. 4e shows the dimensions and a top view of the counterbalance 3.

FIG. 5 demonstrates how the position sensing system 30 operates. The four elements of the photodetector 40 are shown in FIGS. 5a and 5b. The LED 14 projects a light through the aperture 33 of the bobbin 2 creating an imaged spot 37 on the four elements of the photodetector 40 to determine the position of the optical element 1. When the optical element 1 is properly positioned, the imaged spot 37 is centered with respect to the photodetector 15 and each portion of the imaged spot 37 exists equally in each of the four elements of the photodetector 40 as can be seen in FIG. 5a. FIG. 5b shows when the imaged spot 37 is off centered and the four elements 40 are unevenly illuminated. The optical element 1 is displaced and requires repositioning.

The leads 33 each correspond to a photodetector element 40 so when the image 37 is off centered, a signal from each of the of the four photodetector elements 40a, 40b, 40c and 40d is sent to a control system 31. The control system is not attached on the actuator 20, but is positioned close thereby. The control system calculates the amount of movement that optical element 1 requires to be repositioned in the track axis 50 and in the focus axis 51. The equations that the control system uses are:

$$(B+D)-(A+C)=X \text{ for the track axis} \quad (2)$$

$$(A+B)-(C+D)=Z \text{ for the focus axis} \quad (3)$$

where

A=signal from first photodetector element 40a

B=signal from second photodetector element 40b

C=signal from third photodetector element 40c

D=signal from fourth photodetector element 40d

The control system has a track current command that sends current appropriately to the track axis coils 4 or focus axis coils 7 for correct positioning.

This invention has been described herein in considerable detail in order to comply with the Patent Statutes and to provide those skilled in the art with the information needed to apply the novel principles and to construct and use such specialized components as are required. However, it is to be understood that the invention is not restricted to the particular embodiment that has been described and illustrated, but can be carried out by specifically different equipment and devices, and that various modifications, both as to the equipment details and operating procedures, can be accomplished without departing from the scope of the invention itself.

The embodiments of the invention in which an exclusive property or right is claimed are defined as follows:

1. An apparatus for detecting position of an optical element and repositioning the optical element when necessary comprising:

a suspended support structure supporting the optical element;

a light emitting means;

a photodetector, aligned in a straight line with the light emitting means, which detects when the optical element is out of position by an image created onto elements within the photodetector by the light emitting means;

a first end of the apparatus with connections coming out of the apparatus to connect the apparatus with external connections and a second end of the apparatus opposite the first end;

a control system connected to the photodetector;

magnetic means; and a plurality of driving coils which are used with the magnetic means to move the optical element along two axes, a first axis and a second axis, so that the optical element is moved back into position.

2. The apparatus of claim 1 wherein the suspended support structure is circular shaped and an aperture is machined through center of gravity of the suspended support structure.

3. The apparatus of claim 1 wherein two driving coils of the plurality of driving coils are used to move the optical element in a first axis and are located in front of the optical element closer to the first end of the apparatus, and a driving coil coils of the plurality of driving coils is used to move the optical element in a second axis and is located behind the optical element closer to the second end of the apparatus.

4. The apparatus of claim 1 wherein the photodetector comprises four detector elements.

5. The apparatus of claim 1 wherein the light emitting means is a light emitting diode.

6. The apparatus of claim 1 wherein the light emitting means exists behind the physical center of the suspended support structure closer to the second end of the apparatus.

7. The apparatus of claim 1 wherein the photodetector exists in front of the physical center of the suspended support structure closer to the first end of the apparatus.

8. The apparatus of claim 1 wherein the driving coils exist in proximity to the magnetic means.

9. The apparatus of claim 1 wherein the magnetic means comprises a plurality of magnets.

10. The apparatus of claim 9 wherein the plurality of magnets comprise of at least four magnets used to position the optical element on the first axis.

11. The apparatus of claim 10 wherein of the four magnets at least two magnets are positioned on one side of the optical element on the first axis and at least two magnets are positioned on the other side of the optical element on the first axis.

12. The apparatus of claim 11 wherein the two magnets, consisting of a first magnet and a second magnet, are placed next to each other with a magnetic pole of the first magnet opposite a magnetic pole of the second magnet next to the first magnet.

13. The apparatus of claim 9 wherein the plurality of magnets comprise of at least four magnets used to position the optical elements on the second axis.

14. The apparatus of claim 13 wherein of the four magnets at least two magnets are positioned on one side of the optical element on the first axis and at least two magnets are positioned on the other side of the optical element on the first axis.

15. The apparatus of claim 14 wherein the two magnets, consisting of a first magnet and a second magnet, are placed next to each other with a magnetic pole of the first magnet opposite a magnetic pole of the second magnet next to the first magnet.

16. An apparatus for detecting position of an optical element and repositioning the optical element when necessary, comprising:

a circular suspended support structure supporting the optical element wherein an aperture is machined through center of gravity of the suspended support structure;

a light emitting diode which exists behind the aperture of the suspended support structure;

a four element photodetector which detects when the optical element is out of position by an image created onto the four detector elements within the photodetector by the light emitting means;

a control system connected to the photodetector; magnets; and driving coils which are used with the magnetic means to move the optical element along two axes in which the control system energizes the driving coils appropriately so that the optical element is moved back into position.

* * * * *